United States Patent
Jung et al.

(10) Patent No.: US 11,333,284 B2
(45) Date of Patent: May 17, 2022

(54) CENTRE SYSTEM

(75) Inventors: Boudewijn Casper Jung, Bergen op Zoom (NL); Johannes Louis Leonardus Hessels, Mierlo (NL)

(73) Assignee: IHC Holland IE B.V., Sliedrecht (NL)

( * ) Notice: Subject to any disclaimer, the term of this patent is extended or adjusted under 35 U.S.C. 154(b) by 570 days.

(21) Appl. No.: 14/128,200

(22) PCT Filed: Jun. 22, 2012

(86) PCT No.: PCT/NL2012/050438
§ 371 (c)(1),
(2), (4) Date: Feb. 6, 2014

(87) PCT Pub. No.: WO2012/177131
PCT Pub. Date: Dec. 27, 2012

(65) Prior Publication Data
US 2014/0154015 A1    Jun. 5, 2014

(30) Foreign Application Priority Data
Jun. 22, 2011    (NL) ..................... 2006982

(51) Int. Cl.
*F16L 55/033*    (2006.01)
*E02D 13/00*    (2006.01)
(Continued)

(52) U.S. Cl.
CPC .......... *F16L 55/0333* (2013.01); *E02D 13/00* (2013.01); *E02D 13/005* (2013.01);
(Continued)

(58) Field of Classification Search
CPC ....... E02D 13/00; E02D 13/005; E02D 13/04; E02D 7/28; E02D 7/14; F16L 7/00;
(Continued)

(56) References Cited

U.S. PATENT DOCUMENTS

| 3,502,159 | A |   | 3/1970 | Pogonowski |
| 4,102,147 | A |   | 7/1978 | Jansz |
| 4,451,177 | A | * | 5/1984 | Goldsmith ............... E21B 7/128 166/341 |

(Continued)

FOREIGN PATENT DOCUMENTS

| DE | 20 2009 006 507 U1 | 8/2009 |
| JP | S58-42401 | 3/1983 |

(Continued)

OTHER PUBLICATIONS

International Search Report, dated Aug. 29, 2012, from corresponding PCT application.

*Primary Examiner* — Benjamin F Fiorello
*Assistant Examiner* — Stacy N Lawson
(74) *Attorney, Agent, or Firm* — N.V. Nederlandsch Octrooibureau

(57) ABSTRACT

The invention relates to an assembly for centring a first elongate tubular element and a second elongate tubular element, such as an underwater pile accommodated within a noise mitigation screen, at a common central longitudinal axis along which axis both the first and second element extend, and wherein the centre system is provided with first coupling element for fixedly coupling the centre system with one of the first and second tubular elements, and second coupling element for engaging the other tubular element for centring the other tubular element at the central axis.

12 Claims, 4 Drawing Sheets

(51) Int. Cl.
*E02D 13/04* (2006.01)
*G10K 11/16* (2006.01)
*F16L 1/20* (2006.01)
*F16L 3/12* (2006.01)

(52) U.S. Cl.
CPC ................ *E02D 13/04* (2013.01); *F16L 1/20* (2013.01); *F16L 3/1211* (2013.01)

(58) Field of Classification Search
CPC ....... F16L 55/033; F16L 55/0333; F16L 1/20; F16L 3/1211; F16L 3/1218; F16L 3/16; F16L 3/18
USPC ...................................... 405/184.1, 227, 228
See application file for complete search history.

(56) References Cited

U.S. PATENT DOCUMENTS 4,484,842 A * 11/1984 Engelhaupt ............. E02D 13/04
405/232
5,423,633 A * 6/1995 Verstraeten ............... E02D 7/28
405/228
2002/0009333 A1 * 1/2002 Willis ..................... F16L 1/207
405/158
2005/0083783 A1 4/2005 Baskerville et al.
2012/0241039 A1 * 9/2012 Jung ........................ E02D 7/14
138/155

FOREIGN PATENT DOCUMENTS

| JP | S59-54803 | | 3/1984 |
|----|-----------|---|--------|
| JP | 8 049235 A | | 2/1996 |
| JP | 08049235 A | * | 2/1996 |
| JP | 08092958 A | * | 4/1996 |
| JP | S52-48210 | | 4/1997 |
| JP | 11256576 A | | 9/1999 |
| JP | 2011/012394 A | | 1/2011 |
| JP | 2011012394 A | * | 1/2011 |
| JP | 2011012394 A | * | 1/2011 |
| WO | 2010/151121 A2 | | 12/2010 |

* cited by examiner

CENTRE SYSTEM

BACKGROUND

The present invention relates to an assembly of a first and second elongate tubular element, such as an underwater pile accommodated within a noise mitigation screen, and a centre system suitable for centring the first elongate tubular element and the second elongate tubular element, and wherein the assembly has a common central longitudinal axis along which axis both the first and second tubular element extend.

The present invention specifically relates to an assembly having a centre system for centring and/or maintaining centred, a tubular element having a tapered section, or sections of different diameter like a telescopic pile, in particular during hammering of the tubular element having a tapered section.

The invention further relates to a method for centring a first elongate tubular element and a second elongate tubular element, such as an underwater pile accommodated within a noise mitigation screen, at a common central longitudinal axis along which axis both the first and second element extend US 2005/0083783 A1 discloses an underwater energy dampening device which device includes a plurality of vertically spaced bubble producing units. With bubbles produced al various depths, the present invention can effectively attenuate sound and other energy from underwater construction projects in high current or deep water areas.

U.S. Pat. No. 4,102,147 relates to a submersible positioning and guiding apparatus for pile driving. Use of hydraulic cylinders is shown for positioning a pile within a frame. However under circumstances the positioning of the pile in the frame is insufficient leaving e.g. parallel and angular misalignment. In addition, control of the hydraulic cylinders is cumbersome.

SUMMARY OF THE INVENTION

The invention aims to provide a assembly wherein at least one of the problems of known centre system is at least partly solved.

Yet another object of the invention is to provide an alternative centre system. According to a first aspect of the invention this is realized with an assembly of a first and second elongate tubular element, such as an underwater pile accommodated within a noise mitigation screen, and a centre system suitable for centring the first elongate tubular element and the second elongate tubular element, and wherein the assembly has a common central longitudinal axis along which axis both the first and second tubular element extend and wherein the centre system comprises;

- a first coupling means for fixedly coupling the centre system with one of the first and second tubular elements, and
- a second coupling means for engaging the other of the first and second tubular element for centring the other tubular element at the common central longitudinal axis, and
- a drive system having at least two drive means arranged around the common central longitudinal axis, each drive means having a line of action for applying a centring force at a circumference of one of the first and second tubular elements towards a centred position of said one of the first and second tubular elements at the common central longitudinal axis, wherein the at least two drive means are mutually coupled for evenly driving said one of the first and second tubular elements for maintaining said one of the first and second tubular elements in its centred position, and wherein the centre system is fixedly coupled with the one of the first and second tubular elements, and engages the other tubular element for centring the other tubular element at the common central longitudinal axis such that an intermediate space between the one of the first and second tubular elements and the other tubular element is optimal with respect to noise dampening.

This provides the possibility of maintaining a pile with a tapered section in its centred position relative to an outer tubular element such that an intermediate space between the pile and the outer tubular element is optimal with respect to noise dampening. The at least two drive means being mutually coupled for evenly driving said one of the first and second tubular elements for maintaining said one of the first and second tubular elements in its centred position ensures that optimal noise dampening is maintained independent of external loads, like flow or swell, to the first and second tubular elements.

The centre system of the assembly is also useful when using one of the first elongate tubular element and second elongate tubular element as a template for the other. Thus, said one tubular element provides a reference for the other tubular element.

In this connection a centred position may be interpreted broadly such that it means e.g. that both an underwater pile and a noise mitigation screen are centred at a common central longitudinal axis such that noise transmission from the pile to the surrounding is dampened. In practice a considerable off centred pile or screen still may result in a dampened noise transmission.

The centre system is capable to accommodate considerable side forces which occur during offshore use.

In an embodiment of the centre system, the second coupling means couples the centring system and the other of the first and second tubular element (2) such that longitudinal movement of the other of the first and second tubular element (2) along the central axis is allowed.

In an embodiment of the assembly, the at least two drive means are symmetrically and/or evenly distributed around the central axis. This is even more beneficial for centring the first and second tubular element in a controlled manner.

In an embodiment of the assembly, the at least two drive means are oppositely arranged around the central axis.

In an embodiment of the assembly, the line of action of each drive means, intersects the central longitudinal axis. This is beneficial for the effectiveness of the assembly.

In an embodiment of the assembly, the drive system comprises three drive means.

In an embodiment of the assembly, the centre system comprises a hydraulic system and wherein the drive system is part of the hydraulic system.

In an embodiment of the assembly, a first drive means of the at least two drive means comprises a first hydraulic cylinder and a second drive means of the at least two drive means comprises a second hydraulic cylinder, the first and second hydraulic cylinder being mutually volumetrically coupled for evenly driving said one of the first and second tubular elements for maintaining said one of the first and second tubular elements in its centred position. This is beneficial in connection with control of the drive means. Because of the volumetric coupling the first and second cylinder are evenly driven.

In an embodiment of the assembly, the first and second hydraulic cylinder are mutually hydraulically series coupled for evenly driving said one of the first and second tubular elements for maintaining said one of the first and second tubular elements in its centred position. This is even more beneficial in connection with control of the drive means. Powering one of the first and second hydraulic cylinders, drives the other cylinder as well in an even manner.

In an embodiment, the assembly comprises a first source of pressurized hydraulic fluid for biasing the said one of the first and second tubular elements towards its centred position.

In an embodiment of the assembly, the first source of pressurized fluid is directly coupled with only one of the first and second hydraulic cylinder. This is beneficial for ease of operation and construction of the assembly.

In an embodiment of the assembly, the second coupling means comprises at least one of the following, a levering means, a rolling means, and a sliding means, for engaging the other tubular element for centring the other tubular element at the central axis. In particular the levering means, do even more facilitate the centre system to centre a tubular element having a tapered section.

In an embodiment, the assembly comprises a plurality of centre systems arranged along the central axis for mutually aligning the first and second elongate tubular element at the central axis.

The invention further relates to a method for centring a first elongate tubular element and a second elongate tubular element, such as an underwater pile accommodated within a noise mitigation screen, at a common central longitudinal axis along which axis both the first and second element extend, and wherein the method comprises;
  providing a drive system for applying a centring force, having at least two drive means arranged around the central axis,
  applying a centring force at a circumference of one of the first and second tubular elements towards a centred position of said one of the first and second tubular elements at the central axis,
  evenly driving the at least two drive means for maintaining said one of the first and second tubular elements in its centred position.

The invention further relates to a device comprising one or more of the characterising features described in the description and/or shown in the attached drawings.

The invention further relates to a method comprising one or more of the characterising features described in the description and/or shown in the attached drawings.

The various aspects discussed in this patent can be combined in order to provide additional advantages.

DESCRIPTION OF THE DRAWINGS

The invention will be further elucidated referring to a preferred embodiment shown in the drawing wherein shown in.

DETAILED DESCRIPTION OF EMBODIMENTS

Figure 1:
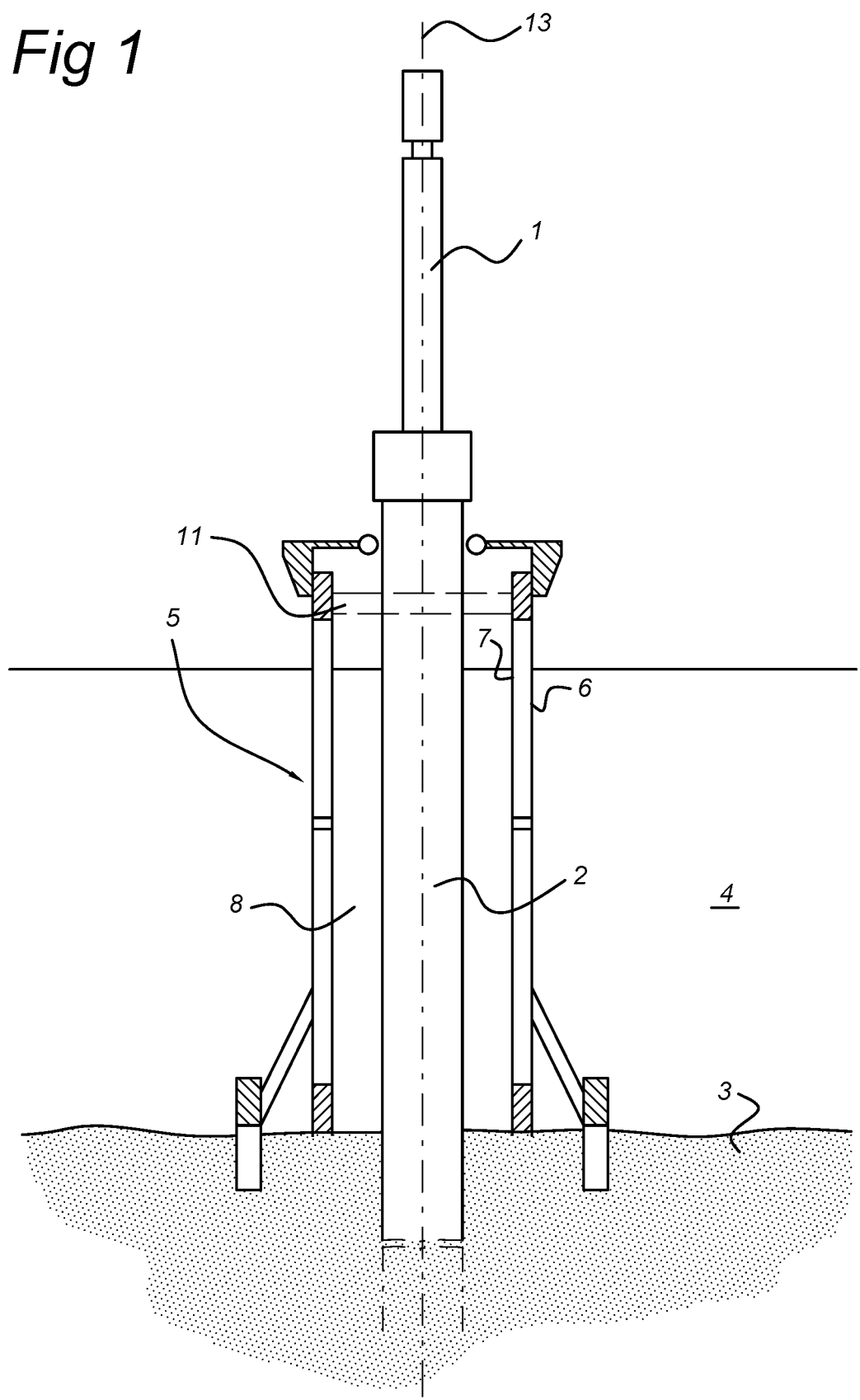
FIG. 1 in a cross sectional side view an assembly of a centre system and a first and second tubular element.

FIG. 1 shows in a cross sectional side view an assembly of a centre system 11, which is schematically depicted, and a first and second tubular element. The FIG. 1 shows a pile-driving device 1 by means of which a tubular element here a pile element 2 can be driven into the bottom 3 of a body of water 4. A second tubular element, here an elongate tube 5, is provided around the pile element 2. In this case, the elongate tube 5 comprises an outer wall 6 and an inner wall 7. The pile element 2 and the tube 5 are ideally arranged concentrically with respect to one another along a central axis 13, with an intermediate space 8 being present between the pile element 2 and the tube 5.

In the illustrated embodiment, the pile 2 and tube 5 is of a substantially cylindrical design. In other embodiments (not shown), the tube may of course have another shape, provided that an intermediate space is formed between the outer and inner wall which can reduce the transmission of noise or vibrations to the environment.

The tube 5 is preferably made from steel walls. The structure of the tube may be self-supporting, which means that no separate supporting structure has to be provided in order to keep the tube in its vertical position.

FIG. 1 shows that a centre system 11 is provided at the top of the tube 5. Here, the centre system 11 is schematically depicted. In practice several centre systems 11 may be arranged along the length of the pile 2 for centring and aligning the pile 2 with the tube 5. This centre system 11 ensures that the source of sound, being the pile 2 while being hammered down by hammering installation 1, remains centred in the tube 5, which is an optimal position in view of noise dampening. The diameter of the pile 2 can vary along its length, therefore the centre system is adjustable so that this variation can be allowed and in addition any intended narrowing and/or widening of the pile 2 can be accommodated by the centre system. The pile 2 may for example have a tapered section, or sections of different cross section like a telescopic pile.

The dimensions of the centre system vary, depending on the dimensions of the sound source, being the pile 2. The pile may have a characteristic diameter of 4-6 m or more, the diameter of the tube 5 will in practice be 7 m or more, so that the distance between the sound source and the inner side of the tube is sufficiently large to prevent contact noise (that is to say transmission of noise by direct contact between the sound source and the tube).

Figure 2:
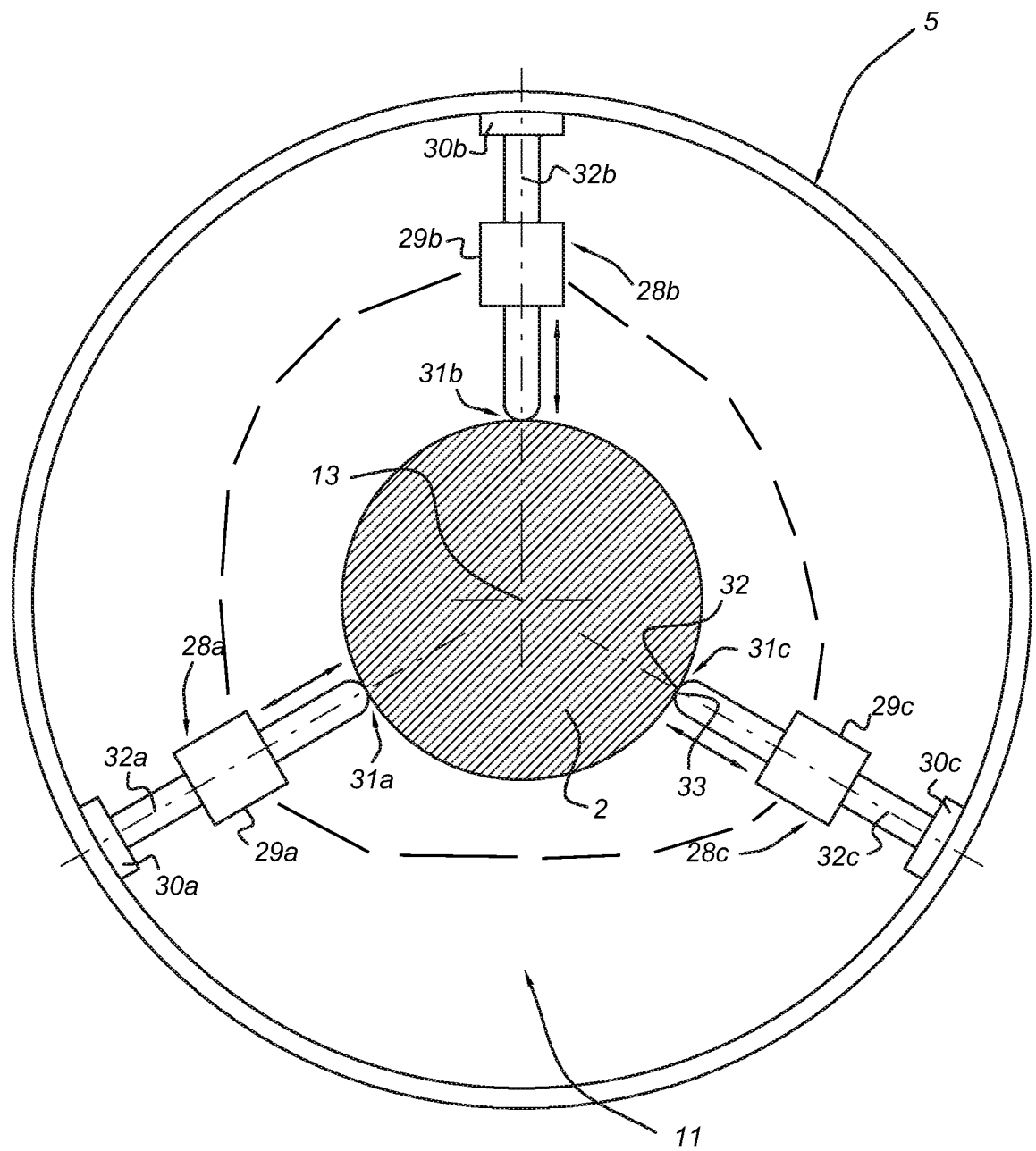
FIG. 2 a top view of a centre system according to the invention.

FIG. 2 shows a top view of a centre system 11 according to the invention. Here, the centre system 11 is fixedly coupled with tube 5, and engages the pile 2 for centring the pile 2 at the central axis 13. The first coupling means 30a, 30b, 30c fixedly couple the centre system 11 with the tube 5. The second coupling means 31a, 31b, 31c engage 15 the pile 2 for centring the pile at the central axis 13. The pile 2 is able to slide with respect to the second coupling means 31a, 31b, 31c. The drive system has three drive means 28a, 28b, 28c evenly arranged around the central axis 13. Here, each drive means 28a, 28b, 28c has a line of action 32a, 32b, 32c for applying a centring force at a circumference of the pile 2 towards a centred position of the pile at the central axis 13. The drive system can be mutually coupled for evenly applying the centring force to the pile 2. FIG. 2 shows such a configuration schematically through dashed lines between drive means 28a, 28b, 28c.

Figure 3:
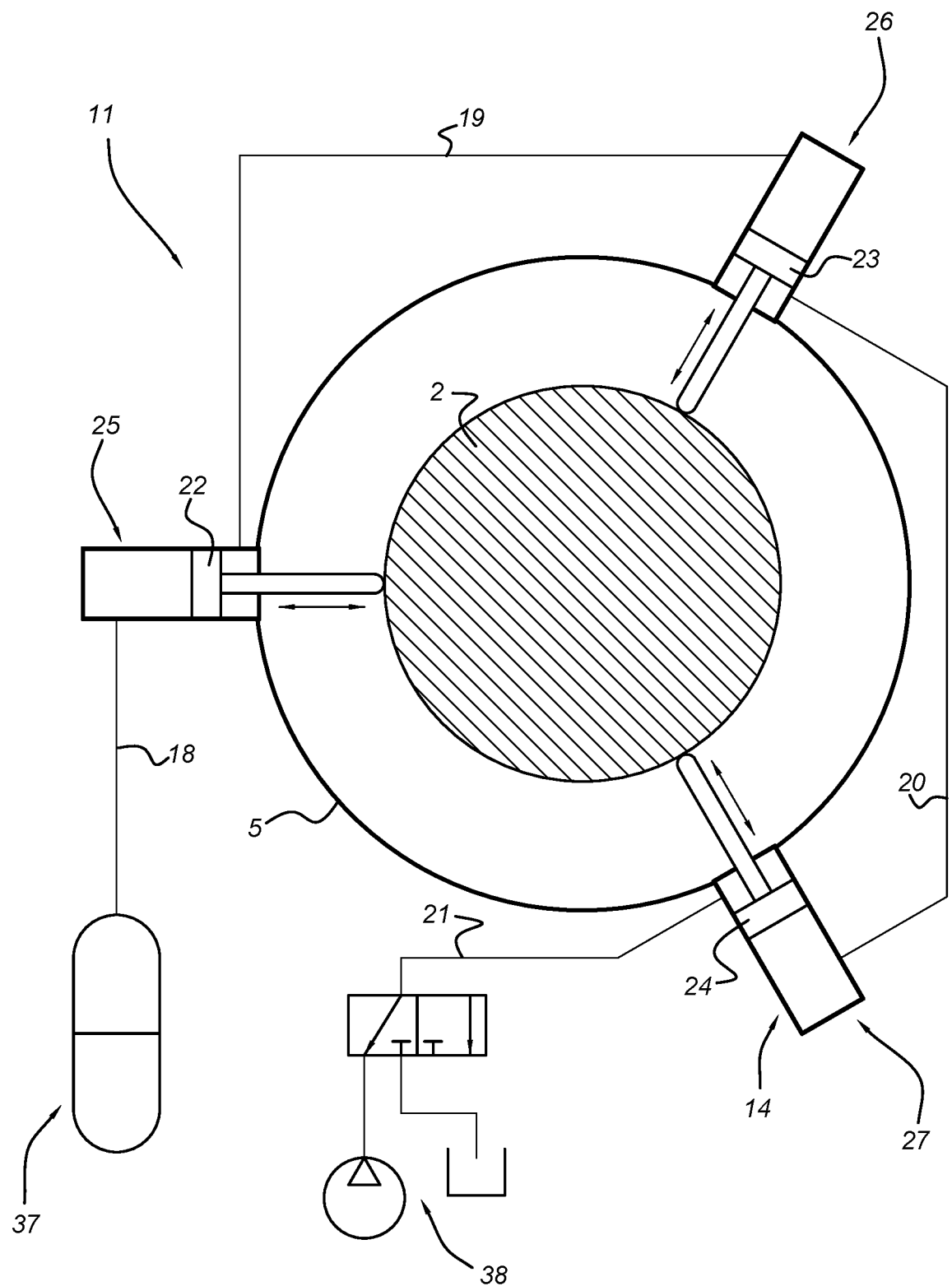
FIG. 3 a schematic view a hydraulic system of an embodiment of the centre system according to the invention.

FIG. 3 shows a schematic view a hydraulic system 14 of an embodiment of the centre system 11 according to the invention. The hydraulic system 14 is divided in number of hydraulic sections 18, 19, 20 and 21, separated by respective cylinder pistons 22, 23, 24 in cylinders 25, 26, 27. The hydraulic sections, though separated with respect to hydraulic fluid itself, are series coupled with respect to displaced volume of hydraulic fluid. When during operation, the piston 22 of the first hydraulic cylinder is forced to move over a certain stroke, e.g. because of a tapered section of a pile 2, a certain volume of hydraulic fluid is displaced in the second hydraulic section 19. The piston diameter 23 of a subsequent hydraulic cylinder 26 is chosen such that the displaced volume of the second hydraulic section 19 forces the piston 23 of the second hydraulic cylinder to move over a stroke that is equal to that certain stroke of the piston 22 of the first hydraulic cylinder 25. This way, the pile 5 is maintained in its centred position at the central axis 13.

It is conceivable that the hydraulic system 14 comprises two accumulators as a source of pressurized fluid for driving the hydraulic cylinders. Each end of the hydraulic system is coupled with one of the two accumulators. One accumulator 37 is shown, the other accumulator (not shown) is coupled with hydraulic section 21 which section in FIG. 3 is coupled with valve unit 38. Providing two accumulators is beneficial since in that case no supply conduits to the centre system are required during driving of the pile while still providing a controlled actuation of the hydraulic cylinders of the centre system 1.

Figure 4:
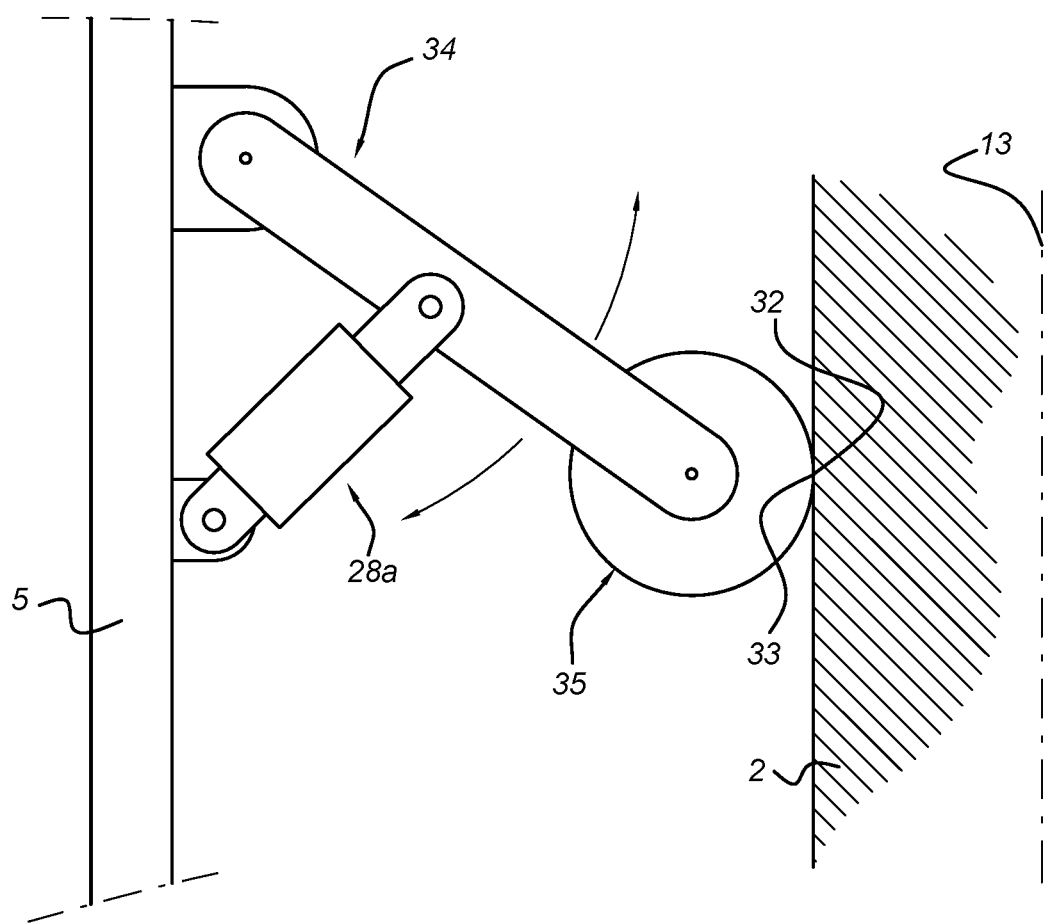
FIG. 4 a side view of a detail of an embodiment of the centre system according to the invention.

FIG. 4 shows a detail of an embodiment of the centre system according to the invention.

A lever arrangement 34 is applied as a first coupling means to fixedly couple the centre system 11 with the tube 5. A contact wheel 35 is applied as a second coupling means to engage the pile 2 for centring the pile at the central axis 13. The pile 2 is able to slide with respect to the wheel 35. The running surface 32 of the wheel 35 engages the outer circumference 33 of the pile 2. Here, a drive means 28a is coupled with the tube 5 and the lever arrangement 34 for applying a centring force at a circumference of the pile 2 towards a centred position of the pile at the central axis 13. The drive means 28a applies the centring force by means of the lever arrangement 34 and the wheel 35. The drive means 28a is hingeably coupled with the pile 2. The drive means 28a is couples with the lever arrangement 34 is a sliding manner.

It will also be obvious after the above description and drawings are included to illustrate some embodiments of the invention, and not to limit the scope of protection. Starting from this disclosure, many more embodiments will be evident to a skilled person which are within the scope of protection and the essence of this invention and which are obvious combinations of prior art techniques and the disclosure of this patent.

The invention claimed is:

1. A noise mitigation system for offshore pile driving, the noise mitigation system comprising:
    a noise mitigation screen extending from a ground on a first end to above a water line on a second end along a central axis, the noise mitigation screen comprising a cylindrical inner wall and a cylindrical outer wall surrounding the inner wall and spaced from the inner wall;
    a pile extending along the central axis through the noise mitigation screen to be driven into the ground under water;
    a centre system comprising first and second coupling means, each of the first coupling means fixed to the inner wall of the noise mitigation screen at a position above the water line and below the second end of the noise mitigation screen, each of the first coupling means extending inward toward the pile, and each of the second coupling means engaging the pile for centring the pile along the central axis; and
    a drive system comprising a plurality of drive means for applying a centring force to the pile through the second coupling means,
    wherein the centre system and the drive system extends only between an inner circumference of the noise mitigation screen and an outer surface of the pile; and
    wherein the plurality of drive means are mutually coupled for evenly applying the centring force to the pile.

2. The noise mitigation system of claim 1, wherein each of the plurality of drive means is a hydraulic cylinder hydraulically series coupled for evenly applying the centring force to the pile.

3. The noise mitigation system of claim 1, wherein the centre system comprises three of the first coupling means and three of the second coupling means, and the drive system comprises three of the drive means.

4. The noise mitigation system of claim 1, wherein each of the second coupling means comprises a levering means.

5. The noise mitigation system of claim 1, wherein each of the second coupling means comprises a rolling means.

6. The noise mitigation system of claim 1, wherein each of the second coupling means comprises a sliding means.

7. The noise mitigation system of claim 1, wherein the noise mitigation screen is one integral elongated cylinder.

8. A method of centring a pile within a noise mitigation screen in an offshore system where the pile is driven into the bottom of a body of water, the method comprising:
    arranging the noise mitigation screen around the pile such that the noise mitigation screen and pile have a common longitudinal axis and the noise mitigation screen extends from the bottom of the body of water to above a water line;
    centring the pile within the noise mitigation screen with a centring system fixed to inner circumference of the noise mitigation screen at a distance from the bottom of the body of water and below an upper end of the noise mitigation screen, the centring system engaging the pile with a centring force with a plurality of coupling means driven by a drive system comprising drive means,
    wherein the centring system and the drive system extend only between the inner circumference of the noise mitigation screen and an outer surface of the pile; and
    wherein the drive means are mutually coupled for evenly applying the centring force to the pile.

9. The method of claim 8, wherein the step of centring the pile within the noise mitigation screen comprises using the centring system, wherein the centring system comprises three of the coupling means driven by the drive system, the three coupling means engaging the pile with the centring force.

10. The method of claim 8, wherein the centring system engages the pile with the plurality of coupling means which comprise at least one of the following: a levering means, a rolling means and a sliding means.

11. The method of claim 8, wherein the centring the pile within the noise mitigation screen comprises using the drive system comprising at least two hydraulic cylinders, each of the at least two hydraulic cylinders coupled to one of the coupling means to provide the driving force for the coupling means.

12. The method of claim 11, wherein the hydraulic cylinders are mutually hydraulically series coupled.

* * * * *